C. HOEFER, Jr., M. L. BELT, Jr. & W. R. BELT.
CHURN.
APPLICATION FILED NOV. 11, 1910.
1,062,709.
Patented May 27, 1913.
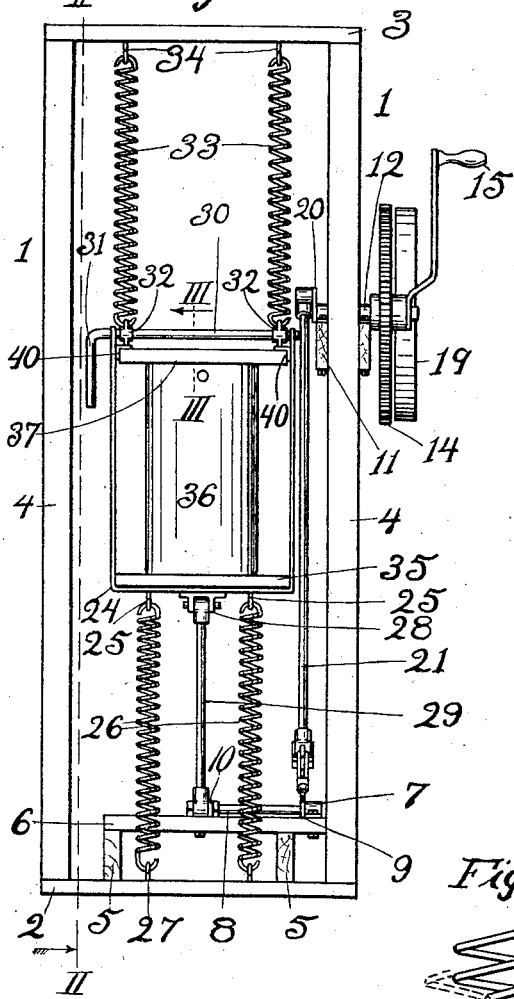
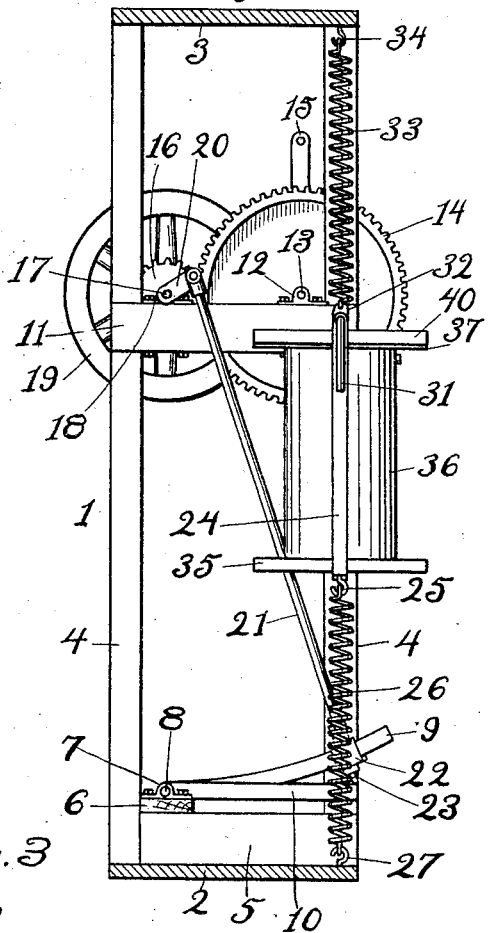
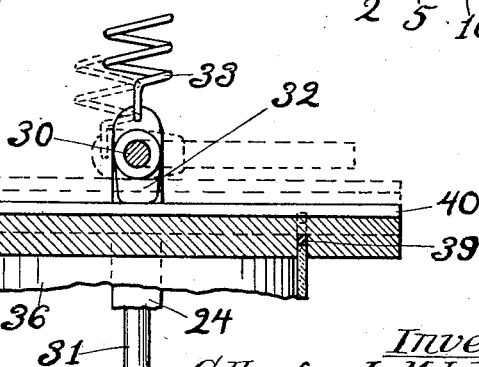
Witnesses:
W. F. Davis
H. C. Rodgers
Inventors:
C. Hoefer Jr., M. L. Belt Jr.
and W. R. Belt.
BY George H. Thorpe atty

UNITED STATES PATENT OFFICE.

CHARLES HOEFER, JR., OF LEXINGTON, MISSOURI, MARCUS L. BELT, JR., OF MUSKOGEE, OKLAHOMA, AND WILLIAM R. BELT, OF ACME, TEXAS.

CHURN.

1,062,709.  Specification of Letters Patent.  Patented May 27, 1913.

Application filed November 11, 1910. Serial No. 591,910.

*To all whom it may concern:*

Be it known that we, CHARLES HOEFER, Jr., a citizen of the United States, residing at Lexington, Lafayette county, Missouri, MARCUS L. BELT, Jr., a citizen of the United States, residing at Muskogee, Muskogee county, Oklahoma, and WILLIAM R. BELT, a citizen of the United States, residing at Acme, Hardeman county, Texas, have invented certain new and useful Improvements in Churns, of which the following is a specification.

This invention relates to churns and our object is to produce a churn in which butter can be made expeditiously and which can be operated with practically no exertion.

A further object is to produce a churn of simple, strong, durable and inexpensive construction.

With these general objects in view and others as hereinafter appear, the invention consists in certain novel and peculiar features of construction and organization as hereinafter described and claimed; and in order that it may be fully understood reference is to be had to the accompanying drawings, in which—

Figure 1, is a front view of a churn embodying our invention. Fig. 2, is a vertical section on the line II—II of Fig. 1. Fig. 3, is an inverted vertical section on the line III—III of Fig. 1.

In the said drawings where like reference characters identify corresponding parts in all the figures, 1 indicates a skeleton frame consisting of a bottom 2, a top 3, and corner uprights 4. Secured upon the bottom is a pair of cleats 5 which serve to stiffen and strengthen the bottom and also as a support for a shelf 6.

7 indicates bearings mounted upon the shelf and 8 a rock shaft journaled in the bearings and provided with forwardly projecting arms 9 and 10, the former being of arcuate shape by preference. The shelf 8 and its arms 9 and 10 constitute what may be termed a U-shaped rock frame.

11 indicates a bar connecting two of the corner uprights and equipped at its upper side with a pair of bearings 12 for a short shaft 13 provided with a master gear wheel 14 and a crank handle 15. The gear wheel 14 meshes with a small gear 16, secured upon a short shaft 17, journaled in bearings 18, secured on bar 11 and said shaft 17 is provided with a fly or balance wheel 19.

Secured upon the inner end of shaft 17 is a short crank 20, pivotally connected by a link 21 to the sleeve 22 adjustably mounted, by preference, on the arcuate arm of the U-shaped frame hereinbefore described, a set screw 23 being provided to secure the sleeve at the desired point of adjustment on said arm.

24 is a U-shaped stirrup provided with depending hooks 25 connected by retractile springs 26 to eye-bolts 27 secured to the bottom 2, and between said depending hooks 25, the stirrup is provided with a bracket 28, to which is pivotally attached the upper end of a rod 29, pivotally attached at its lower end to the arm 10 of the U-shaped rock-frame.

Journaled in the upper ends of the arms of the U-shaped stirrup is a rock-shaft 30, provided with a crank or handle 31 and rigidly secured on shaft 30, are cam clamps 32, flattened at their lower ends, and to the upper ends of the cams are attached the lower ends of a pair of retractile springs 33, attached at their upper ends to hooks 34 depending from the top 3.

The stirrup is formed or provided with a support 35, of sufficient size to conveniently carry a jar or can 36 to contain cream to be churned and to cover the jar, a cover 37 is provided, the same having a circular groove 38 to receive the upper end of the jar, a gasket 39 occupying said groove to insure a liquid tight joint with the jar, and said cover is provided at opposite sides with angle plates 40, to strengthen it and also to receive the pressure of the cams 32. The stirrup and the rock shaft carried thereby, the cam clamps and support 35 together constitute what is for convenience hereinafter termed the jar carrier, and it will be noticed that the connection of the spring 33 with the upper ends of the cam clamps tends to hold the latter vertical and therefore with their flattened lower ends bearing down upon the cover 37 and that the tendency of said springs to hold the cover down is in evidence particularly when said springs are under tension and the jar is being vibrated. The springs 26 and 33 are stretched slightly when in the position shown in Fig. 1, and thus support the stirrup and the parts carried thereby in upright position, upward movement of the stirrup being resisted by springs 26 and downward movement by the springs 33.

Assuming that the jar, which is preferably of glass contains the requisite quantity of cream, the operator grasps handle 15 and turns the same, this movement being transmitted through the gearing described to the shaft 17 and thence through the link 21 to the U-shaped rock frame, the up and down movement of arm 10 of which effects corresponding movement of the stirrup 24, the springs 26 and 33 after the operation is once under way practically performing most of the work of vibrating the jar vertically. The operation of the handle 15 can be maintained readily by a small child as practically no exertion is required to turn it. The speed at which the handle is turned determines the length of time required to produce butter and it will be apparent that by means of the handle and the connections described, the vibratory actions of the churn are of uniform length. When the churning operation is finished, the operator grasps the handle 31 and swings it upward to a horizontal position to withdraw the cam clamps from engagement with the angle plates of the cover 37, to permit the latter to be raised until disengaged from the jar and then pulled horizontally from between the latter and the cam clamps. The jar can be lifted off the support 35 and replaced by a similar jar containing cream if the churning operation is to be repeated. The cover is then fitted on the jar as shown in Fig. 3, and the shaft 30 is again turned through the instrumentality of handle 31 so that the cam clamp shall force the cover tightly down upon the jar, the engagement of the flattened ends of the cam clamps with the angle plates 40 guarding against the accidental turning of shaft 30 while the churning operation is in progress.

From the above description it will be apparent that we have produced a churn possessing the features of advantage enumerated as desirable, and we wish it to be understood that while we have illustrated and described the preferred embodiment of the same we do not desire to be restricted to the exact details of construction shown and described as obvious modifications will suggest themselves to one skilled in the art.

We claim:—

1. In a churn, a suitable frame, a jar carrier, a stirrup receiving the jar carrier, a cover fitting between the arms of the stirrup and adapted as a closure for the jar upon the carrier, a rock shaft extending over the cover and journaled in the arms of the stirrup, a pair of clamps secured on said shaft and flattened at their lower ends, and retractile springs connecting the upper ends of the clamps with the frame above the jar cover, and tending to hold the clamps with their lower or flattened ends in engagement with the cover and the latter pressed down upon the jar.

2. In a churn, a suitable frame, a jar carrier, a stirrup receiving the jar carrier, a cover fitted between the arms of the stirrup and adapted as a closure for the jar upon the carrier, a rock shaft extending over the cover and journaled in the arms of the stirrup, a pair of clamps secured on said shaft and flattened at their lower ends, retractile springs connecting the upper ends of the clamps with the frame above the jar cover, and tending to hold the clamps with their lower or flattened ends in engagement with the cover and the latter pressed down upon the jar, springs pulling on the stirrup in opposition to the first-named springs, and means for imparting up and down movements to the carrier.

In testimony whereof we affix our signatures in the presence of two witnesses.

CHARLES HOEFER, Jr.
M. L. BELT, Jr.
WILLIAM R. BELT.

Witnesses to the signature of Chas. Hoefer, Jr.:
JOHN BOWMAN,
THOMAS T. STRAINCKE.

Witnesses to the signature of M. L. Belt, Jr.:
W. E. DISNEY,
JOE. M. LA HAY.

Witnesses to the signature of Wm. R. Belt:
GEO. JACOBS,
H. W. FONTAINE.